(12) United States Patent
Shim et al.

(10) Patent No.: US 10,520,192 B2
(45) Date of Patent: Dec. 31, 2019

(54) AIR FLOW GUIDE CAP AND COMBUSTION DUCT HAVING THE SAME

(71) Applicant: DOOSAN HEAVY INDUSTRIES CONSTRUCTION CO., LTD., Gyeongsangnam-do (KR)

(72) Inventors: Youngsam Shim, Busan (KR); Donggon Lee, Incheon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 219 days.

(21) Appl. No.: 15/378,776

(22) Filed: Dec. 14, 2016

(65) Prior Publication Data

US 2017/0363289 A1 Dec. 21, 2017

(30) Foreign Application Priority Data

Jun. 16, 2016 (KR) .......................... 10-2016-0075247

(51) Int. Cl.
*F23R 3/00* (2006.01)
*F23R 3/04* (2006.01)
*F23R 3/06* (2006.01)

(52) U.S. Cl.
CPC .............. *F23R 3/005* (2013.01); *F23R 3/002* (2013.01); *F23R 3/04* (2013.01); *F23R 3/045* (2013.01); *F23R 3/06* (2013.01)

(58) Field of Classification Search
CPC .. F01D 9/023; F05D 2250/21; F05D 2250/22; F05D 2250/221; F05D 2250/23; F23R 3/002; F23R 3/005; F23R 3/04; F23R 3/045; F23R 3/06; F23R 2900/03043; F23R 2900/03044
See application file for complete search history.

(56) References Cited

U.S. PATENT DOCUMENTS

| | | | |
|---|---|---|---|
| 2,841,958 A | 7/1958 | Stokes et al. | |
| 2,993,337 A | 7/1961 | Cheeseman | |
| 3,581,492 A | 6/1971 | Norgren et al. | |
| 4,133,633 A | 1/1979 | Fehler et al. | |
| 4,192,138 A | 3/1980 | Szema | |
| 6,494,044 B1 | 12/2002 | Bland | |
| 2010/0269513 A1* | 10/2010 | Berry | F23R 3/06 60/772 |

FOREIGN PATENT DOCUMENTS

| | | |
|---|---|---|
| EP | 2141329 A2 | 1/2010 |
| EP | 2479384 A2 | 7/2012 |

(Continued)

OTHER PUBLICATIONS

An extended European search report issued by the European Patent Office dated Jul. 17, 2017 in connection with European Patent Application No. 16205566.9.

(Continued)

*Primary Examiner* — Scott J Walthour
(74) *Attorney, Agent, or Firm* — Invenstone Patent, LLC

(57) ABSTRACT

An air flow guide cap for inducing an air flow into a through hole of the floor includes: an upper surface upwardly inclined relative to a horizontal plane; and a wall surface downwardly extending along edges of the upper surface except the edge adjacent to an air inlet.

3 Claims, 7 Drawing Sheets

"A-A"

(56) References Cited

FOREIGN PATENT DOCUMENTS

| | | |
|---|---|---|
| EP | 2889466 A1 | 7/2015 |
| GB | 685068 A | 12/1952 |
| JP | 7-318057 A | 12/1995 |
| JP | 2012-47443 A | 3/2012 |
| KR | 1020020039220 A | 5/2002 |
| KR | 10-2013-0143656 A | 12/2013 |

OTHER PUBLICATIONS

Office Action issued in corresponding Korean Application No. 10-2016-0075247, dated Dec. 2, 2016, 6 pages.

* cited by examiner

AIR FLOW GUIDE CAP AND COMBUSTION DUCT HAVING THE SAME

CROSS-REFERENCE TO RELATED APPLICATION

The present application claims the benefit of priority from Korean Patent Application No. 10-2016-0075247 filed in the Korean Intellectual Property Office on Jun. 16, 2016, the entire contents of which are incorporated herein by reference.

BACKGROUND

The present disclosure relates to an air flow guide cap for inducing an air flow into a through hole of a combustion duct, and more particularly, to an air flow guide cap that can increase an inflow amount of compressed air going into through holes formed in a sleeve.

A gas turbine is a rotary type heat engine which actuates a turbine with high-temperature and high-pressure combustion gas. In general, a gas turbine includes a compressor, a burner and a turbine. The gas turbine generates expanding high-temperature combustion gas that is made when air compressed in the compressor is mixed and burns together with fuel, and rotates the turbine using power of the combustion gas so as to obtain driving power.

In order to transmit the high-temperature combustion gas made in the burner to the turbine, a duct structure is used, which may be referred to a combustion duct assembly. The combustion duct assembly generally includes: a liner abutting on the burner; a transition piece connected with the liner; and a sleeve surrounding the liner and the transition piece.

BRIEF SUMMARY

In an embodiment, there is provided an air flow guide cap for inducing an air flow into through holes formed in the floor, including: an upper surface upwardly inclined relative to a horizontal plane; and a wall surface downwardly extending along edges of the upper surface except the edge adjacent to an air inlet.

An edge of the rear side at the opposite side of an inlet of the upper surface may be in the form of an arc, for instance, a semicircle.

Moreover, edges of the wall surface extending from both ends of the edge at the inlet of the upper surface may be formed to be inclined inwardly.

Here, the upper surface may be formed to have the size that the through hole is located inside an orthogonal projection relative to the horizontal plane of the upper surface.

Furthermore, the air flow guide cap may further include a protrusion member which downwardly extends from the edge of the rear side at the opposite side of the inlet of the wall surface and is inserted into the through hole.

The protrusion member may be in contact with the inner circumferential surface of the through hole, and for this, the protrusion member is in the form of a pipe or in the form that some of a pipe is cut.

In another aspect of the present disclosure, a combustion duct includes: a combustion duct of a gas turbine in which air flows on the surface and which has a plurality of through holes for inducing air; and a plurality of air flow guide caps each of which includes an upper surface upwardly inclined relative to a horizontal plane and a wall surface downwardly extending along edges of the upper surface except the edge adjacent to an air inlet, wherein the air flow guide caps are combined on the combustion duct to surround the through holes one by one.

Here, the air flow guide caps may be arranged in the direction of the air flow are gradually increased in height toward the downstream side of the air flow.

The combustion duct may be a sleeve.

The air flow guide cap of the present disclosure may be advantageous in securing a flow rate of cooling air due to an increase of a cross-sectional area of the inlet because the inlet through which air is induced is inclined upwardly, and it is easy to induce the air flow in the vertical direction to pass through the through hole because the upper surface is inclined toward the through hole.

Furthermore, because the air flow guide cap may be formed as long as the upper surface, it can cover all of the through holes, and turbulence at the inlet zone of the through hole may be reduced so that a stable air flow is formed.

Additionally, because the air flow guide cap may include a protrusion member which is inserted into the through hole, the air flow guide cap can be arranged and combined at the correct position relative to the through hole and guide the vertical air flow into the depth of the combustion duct.

In addition, the present disclosure may provide uniform cooling effect throughout the entire of the combustion duct without unequal distribution when the heights of the air flow guide caps arrayed are gradually increased according to the air flow.

BRIEF DESCRIPTION OF THE DRAWINGS

The above and other objects, features and advantages of the present disclosure will be apparent from the following detailed description of the preferred embodiments of in conjunction with the accompanying drawings, in which.

DETAILED DESCRIPTION

Figure 1:
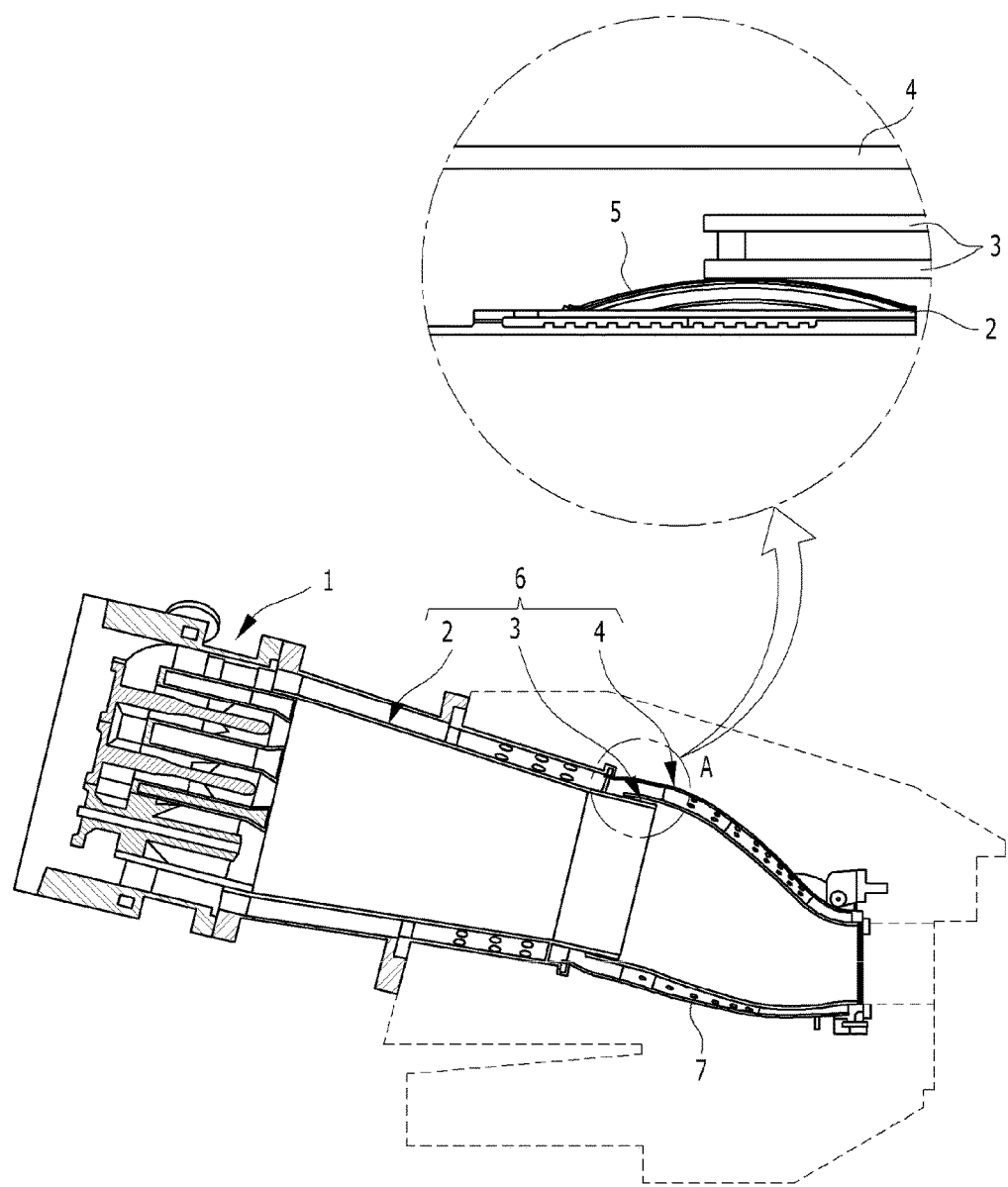
FIG. 1 is a view showing a general structure of a combustion duct assembly of a gas turbine.

Hereinafter, the present disclosure will be described in more detail with reference to the exemplary embodiments.

In assigning reference numerals to elements in each drawing, it shall be noted that like elements have like reference numerals as much as possible even if illustrated in different drawings. In the drawings, thicknesses of lines and sizes of constituent elements may be exaggerated for clarity and convenience in explanation.

Furthermore, in describing elements of the present invention, terms such as first, second A, B, (a), (b) and others may be used. Such terms are used only for purposes of distinguishing an element from other element, but do not limit the substance of the element, sequence or order. If it is stated that a certain element is "connected", "coupled" or "contacts" to another element, it should be understand that the certain element may be directly connected or coupled to the another element, but also another element may be "connected", "coupled" or "contacts" to such elements.

Referring to FIG. 1, a combustion duct assembly 6 will be described in more detail. The burner 1 is arranged on the upstream side of the liner 2, and an annular spring seal 5 which is outwardly convex is attached on the outer face of the downstream side of the liner 2 connected with the transition piece 3. The annular spring seal 5 may be referred to as a 'hula seal'. Moreover, the transition piece 3 has a double tube structure including: an inner wall which resiliently in contact with the convex part of the spring seal 5 attached to the downstream side of the liner 2; and an outer wall surrounding the inner wall. Therefore, the liner 2 and the transition piece 3 are mutually connected to each other while sliding through an elastic medium of the spring seal 5 even though there occurs thermal deformation by the high-temperature combustion gas.

However, the combustion duct assembly 6 requires proper cooling because it is a path for a flow of the high-temperature combustion gas. For this, a housing of the gas turbine may be completely filled with some of the air highly compressed in the compressor, and a plurality of through holes 7 are formed in the outer wall of the transition piece 3 and the sleeve 4 surrounding the liner 2 so that compressed air is induced from the outer surface of the sleeve 4 toward the transition piece 3. The air induced into the sleeve 4 cools the transition piece 3 and the liner 2 while ascending toward the burner 1, and finally, enters the burner 1 and is mixed with fuel to be burned.

In order to cool the liner 2 and the transition piece 3, lots of air is induced through the through holes 7 formed in the sleeve 4. For this, various members for inducing an air flow into the through holes are mounted around the through holes 7 of the sleeve 4.

A scoop 8 may be used to induce air. The scoop 8 has the shape like an ice cream scoop, and has a quarter hemispherical shape. The diameter of the scoop 8 is slightly larger than the diameter of the through hole 7 of the sleeve 4. When such a scoop 8 is joined along the circumference of the through hole 7 to surround about half of the through hole, the air passing around the through hole 7 is caught by the scoop 8 and goes into the through hole 7. Therefore, the scoop 8 can function to increase the air volume going into the sleeve 4.

Figure 2:
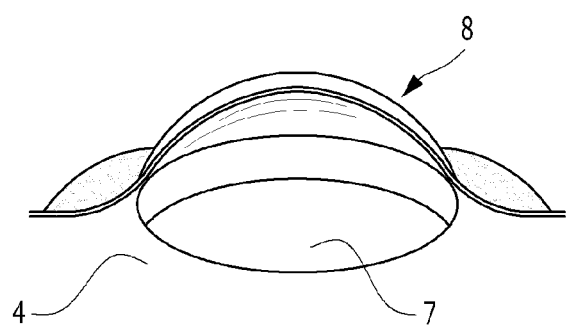
FIG. 2 is a view showing a scoop disposed on a combustion duct.

However, such an effect to increase the air volume by the scoop having the shape illustrated in FIG. 2 reaches a limit and it is insufficient for increasing combustion heat values associated with an increase in output of the gas turbine. Therefore, it is necessary to improve the scoop.

Figure 3A:
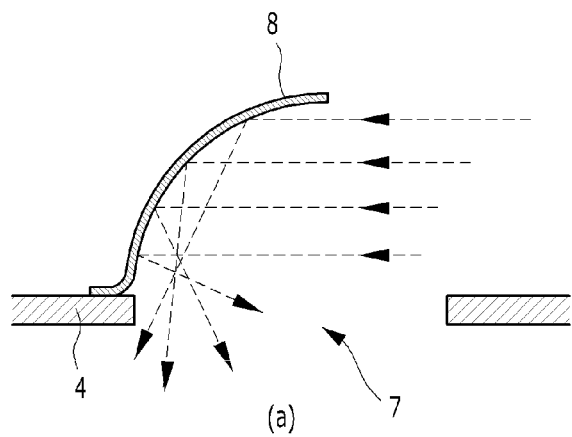
FIG. 3A is a diagram showing a flow of air induced into the scoop of FIG. 2.

FIGS. 3(a) and (b) are respectively a side view and a plan view of the scoop 8 illustrated in FIG. 2.

Figure 3B:
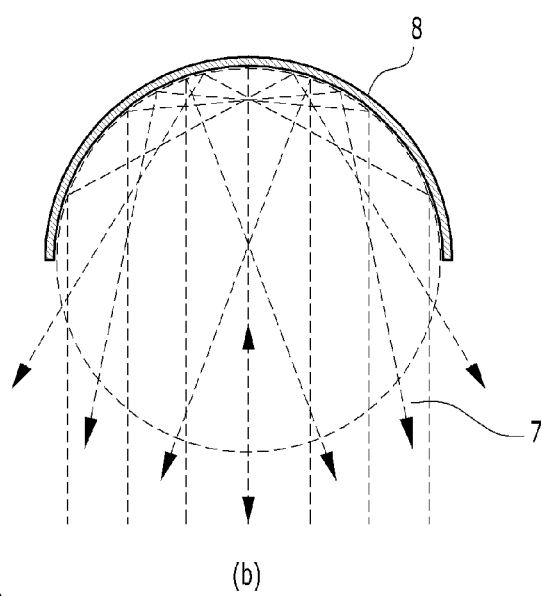
FIG. 3B is another diagram showing a flow of air induced into the scoop of FIG. 2.

As illustrated in FIG. 3, in case of the scoop 8 which has the quarter hemispherical shape, because reflection angles of air flows colliding against the spherical surface are all different depending on the position, the air flows may overlap each other and some of the air flows may return out of the through hole 7. Such complicated collision of the air causes irregular turbulence at an inlet area of the through hole 7, and such turbulence hinders a smooth flow of the air into the through hole 7. Additionally, turbulence made at the inlet area of the through hole 7 hinders a flow of the following air. If pressure of the compressed air is increased, the velocity of the air is also increased and Reynolds number which becomes the measure of turbulence formation is also increased.

The present disclosure improves the structural problem of the scoop 8. It is an object of the present disclosure to provide an air flow guide cap of a new form that can increase an inflow amount of compressed air going into through holes formed in a sleeve.

Figure 4:
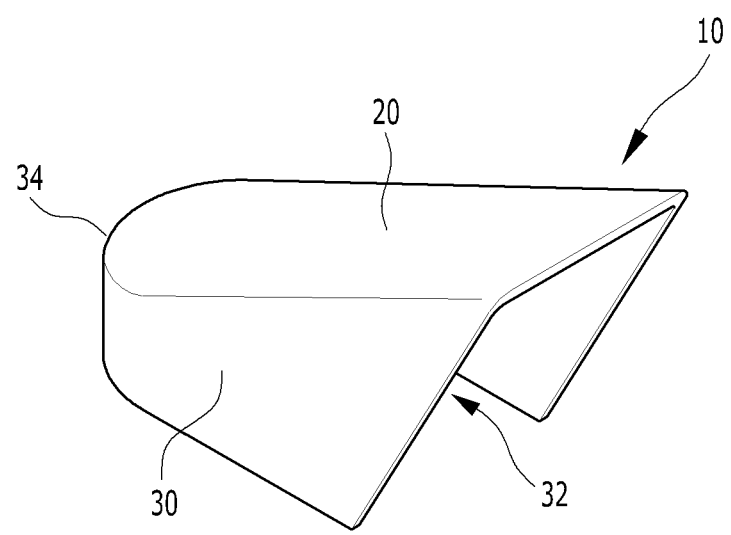
FIG. 4 is a perspective view showing an air flow guide cap according to an embodiment of the present disclosure.

Now, referring to FIGS. 4 and 5, the air flow guide cap 10 according to an embodiment of the present disclosure will be described.

Like the functions of the scoop 8, the present disclosure relates to a combustion duct, for instance, an air flow guide cap 10 for inducing a flow of air flowing along the surface of the sleeve into the through hole 7 toward the wall. Therefore, the air flow guide cap 10 is arranged to surround the through hole 7 such that the through hole 7 is located inside the air flow guide cap 10.

The air flow guide cap 10 includes: an upper surface 20 upwardly inclined relative to a horizontal plane; and a wall surface 30 downwardly extending along edges of the upper surface 20 except the edge adjacent to an air inlet 32. That is, the air flow guide cap 10 has the structure that all sides except the inlet 32 and the bottom side are blocked.

The air flow guide cap 10 may have the size that the through hole 7 of the wall is located inside an orthogonal projection of the upper surface 20 relative to the horizontal plane. In other words, the entire of the through hole 7 may be contained in the air flow guide cap 10, and it is different from the quarter hemispherical structure of the scoop 8 that surrounds just half of the through hole 7.

Such an air flow guide cap 10 is advantageous in securing a flow rate of cooling air due to an increase of a cross-sectional area of the inlet because the inlet 32 through which air is induced is inclined upwardly.

Figure 5:
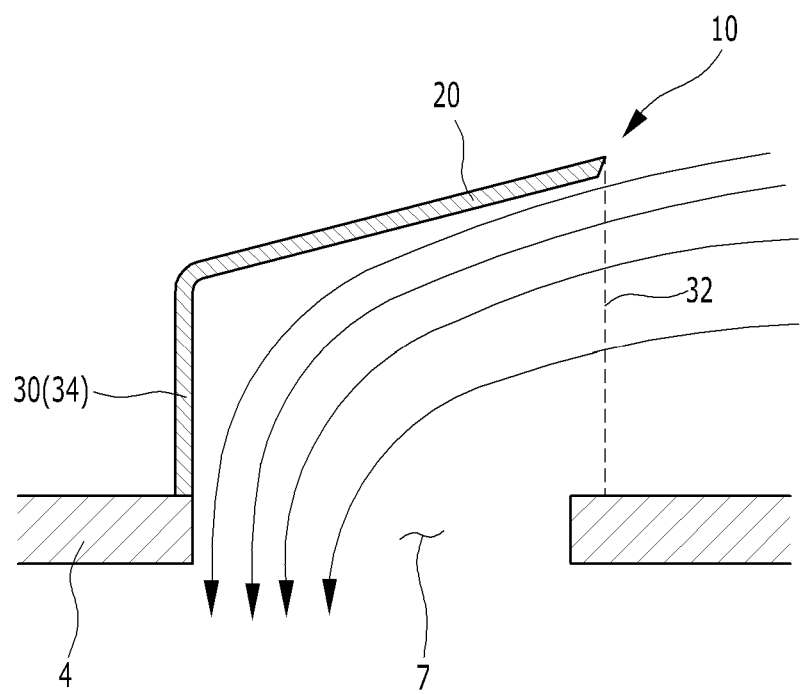
FIG. 5 is a side sectional view of the air flow guide cap of FIG. 4.

Moreover, as shown in FIG. 5, because the upper surface 20 is inclined in the direction of the through hole 7, it is advantageous in inducing the flow of the air induced into the air flow guide cap 10 in the vertical direction to pass through the through hole 7.

Furthermore, because the air flow guide cap 10 is formed as long as the upper surface 20, it can cover all of the through hole 7. The air flow guide cap 10 does not generate or reduces turbulence at the inlet zone of the through hole 7 and induces formation of a streamline flow in which a flow line extends toward the through hole 7.

Therefore, the air flow guide cap 10 has a advantageous structure in that air flowing the surface of the combustion duct forms a stable air flow induced into the through hole 7.

Additionally, in case of the upper surface 20 of the air flow guide cap 10, an edge of a rear side 34 on the opposite side of the inlet 32 may be formed in an arc, for instance, a semicircle. Therefore, the wall surface 30 is formed to be in contact with the edge of the circular through hole 7, so that the air colliding against the wall surface 30 which is opposed to the inlet 32 can be collected in a convergence direction toward the through hole 7.

In addition, the edge of the wall surface 30 extending from both ends of the edge of the inlet side 32 of the upper surface 20 may be inclined inwardly. That is, as shown in FIG. 4, the air flow guide cap 10 has an open side which is slightly open toward both sides of the air inlet 32 of the air flow guide cap 10.

As shown in FIG. 5, because distribution of the air induced into the through hole 7 mainly leans toward the rear side of the through hole 7, namely, the opposite side of the air induction direction, even though the open sides are formed at both sides of the air inlet 32, there is little chance that the air induced into the air flow guide cap 10 leaks out of the cap. So, both sides of the inlet 32 are slightly open in order to receive the air somewhat slantly flowing relative to the length direction of the air flow guide cap 10.

Figure 6A:
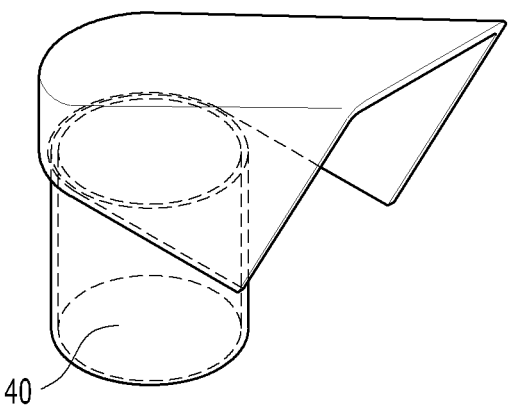
FIG. 6A is a perspective view of an air flow guide cap according to another embodiment of the present disclosure.
Figure 6B:
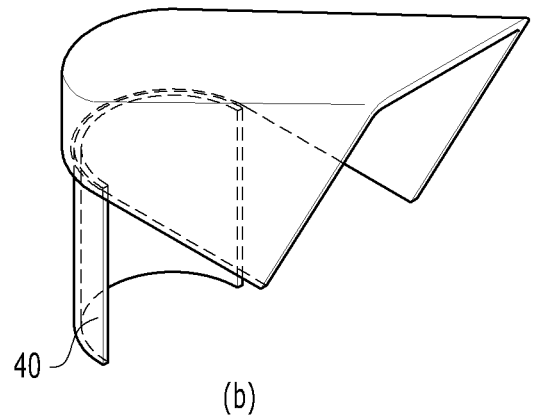
FIG. 6B is a perspective view of another air flow guide cap according to another embodiment of the present disclosure.

In the meantime, referring to FIG. 6, the air flow guide cap 10 may further include a protrusion member 40 which downwardly extends from the edge of the rear side 34 at the opposite side of the inlet 32 of the wall surface 30 and is inserted into the through hole 7.

The protrusion member 40 is joined to the inside of the rear side 34 at the opposite side of the inlet 34 of the air flow guide cap 10, for example, by welding using a pipe or a component obtained by cutting away a portion of the pipe, or is made integrally with the air flow guide cap 10 through pressing or bending.

The protrusion member 40 is inserted into the through hole 7. When the air flow guide cap 10 is joined to the through hole 7, the upper surface 20 and the wall surface 30 of the air flow guide cap 10 are seen from the outside and the protrusion member 40 inserted into the through hole may not be exposed to the outside. Particularly, in order to by in contact with the inner circumferential surface of the through hole 7, preferably, the protrusion member 40 has an outer diameter corresponding to the diameter of the through hole 7.

Such a protrusion member 40 has two exemplary functions as follows.

First, when the protrusion member 40 of the air flow guide cap 10 is inserted into the through hole 7, a worker can exactly and conveniently carry out adjustment work of the air flow guide cap 10 relative to the through hole 7 avoiding error. Once the protrusion member 40 is inserted into the through hole 7, the worker simply adjusts the direction of the inlet of the air flow guide cap 10 and fixes it, for example, by welding. Accordingly, a significant improvement in work efficiency may be realized when mounting lots of air flow guide caps 10 on the surface of the combustion duct one by one.

Second, the protrusion member 40 guides the vertical air flow going into the through hole 7 deeply the combustion duct. In the case of the combustion duct assembly 6 illustrated in FIG. 1, the liner 2 and the transition piece 3 in which combustion gas flows are arranged inside the sleeve 4, and the air passing through the sleeve 4 must cool the liner 2 and the transition piece 3 which are at high temperature. Therefore, the cooling effect is improved considerably when the air adjacent to the surfaces of the liner 2 and the transition piece 3 is induced or discharged through the protrusion member 40.

Figure 7A:
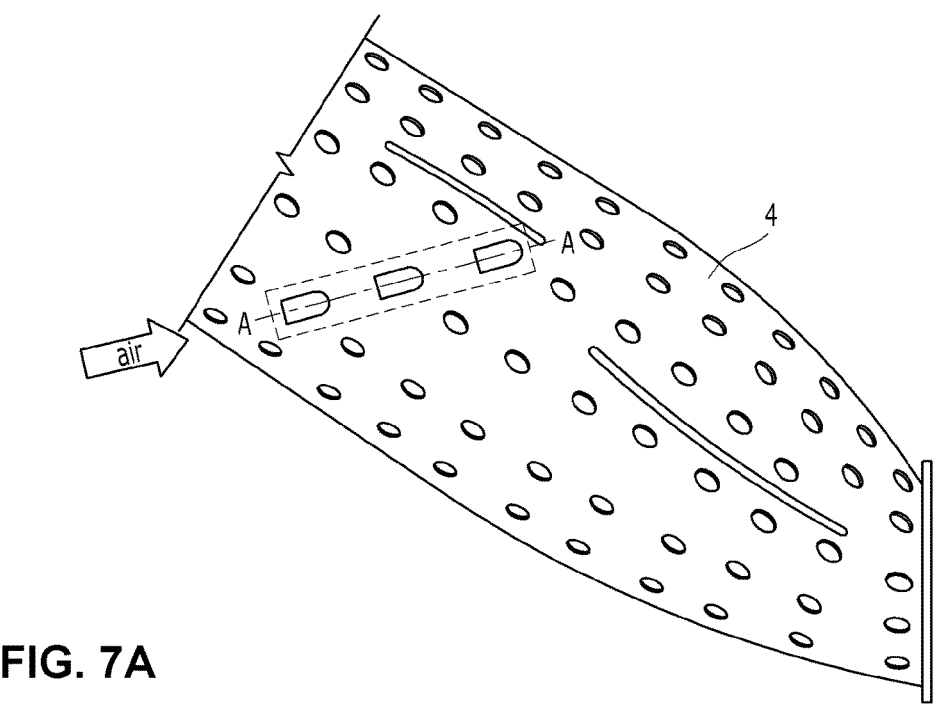
FIG. 7A is a view showing a state where the air flow guide cap is combined to a sleeve which is a combustion duct.

FIG. 7 illustrates the air flow guide cap 10 mounted on the combustion duct. Here, the combustion duct is the sleeve 4.

Compressed air flows on the surface of the sleeve 4, and a plurality of the through holes 7 are formed to induce the air inwardly. The air flow guide caps 10 are arranged and fixed to surround the through holes 7 one by one, and especially, the inlet 32 of the air flow guide cap 10 may be located to be matched to the main flow direction of the air.

The flow of the air flowing on the surface of the sleeve 4 follows a predetermined direction by the designed form and arrangement of the gas turbine. According to the flow direction of the air, lots of air flow guide caps 10 may be arrayed, and as an example, FIG. 7 shows three air flow guide caps 10 indicated by the dashed line.

Figure 7B:
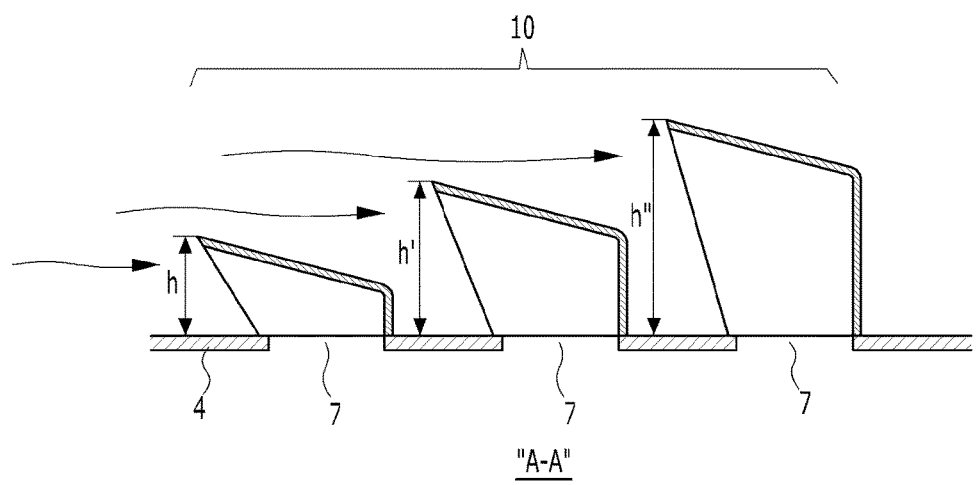
FIG. 7B is a cross section taken along the line A-A of FIG. 7A.

In this instance, as shown in FIG. 7B taken along the line of "A-A", heights (h, h' and h") of the array of air flow guide caps 10 may be gradually increased toward the downstream side of the air flow. The reason is that the air flow guide caps 10 of the upstream side may obstruct introduction of the air into the air flow guide caps 10 of the downstream side. As described above, when the heights of the array of air flow guide caps are gradually increased according to the air flow, the cooling effect may be uniformly provided throughout the entire of the combustion duct with an equal distribution.

Here, FIG. 7 shows an example that the air flow guide cap 10 that has no protrusion member 40 is applied, but it will be understood by those of ordinary skill in the art that the air flow guide cap 10 which has the protrusion member 40 of FIG. 6 can be applied in similar way.

It will be apparent to those skilled in the art that various changes and modifications may be made without departing from the spirit and scope of the following claims.

Moreover, the above advantages and features are provided in described embodiments, but shall not limit the application of the claims to processes and structures accomplishing any or all of the above advantages.

What is claimed is:

1. An apparatus for a gas turbine, comprising:
   a combustion duct that includes a plurality of through holes to induce air flowing on a surface of the combustion duct, the combustion duct having each of a forward end, an aft end, and a longitudinal axis extending between the forward end and the aft end, wherein each through hole is formed on the combustion duct; and
   a plurality of air flow guide caps, each air flow guide cap defining a forward direction and an aft direction and including:
      a wall surface oriented substantially perpendicularly to the surface of the combustion duct;
      an outer surface positioned radially outward, with respect to the longitudinal axis, of the wall surface; and
      an air inlet at a forward side of the air flow guide cap, the air inlet defined by a forward edge of the outer surface, forward edges of the wall surface, and the surface of the combustion duct,
      wherein the wall surface defines a footprint area of the air flow guide cap on the surface of the combustion duct, the footprint area extending from an aft side of the wall surface, between lateral sides of the wall surface, to the forward edges of the wall surface,
      wherein the outer surface is disposed at a preset angle such that the outer surface extends in a radially outward direction, relative to the longitudinal axis, from the aft side of the wall surface, the outer surface being connected with the wall surface at the aft side of the wall surface to form a curved edge, the outer surface extending from a location positioned aft, with respect to the aft direction of the air flow guide cap, of a respective through hole at which the air flow guide cap is disposed to a location positioned forward, with respect to the forward direction of the air flow guide cap, of the respective through hole,
      wherein the respective through hole is positioned within the footprint area,
      the wall surface being connected with the outer surface such that respective lateral edges are formed and extend from the curved edge at the preset angle to the forward edges of the wall surface and the outer surface, respectively, wherein the plurality of air flow guide caps are disposed on the combustion duct respectively at the plurality of through holes, and wherein a first height, measured along a radial direction with respect to the longitudinal axis, of a first air flow guide cap is greater than a second height, measured along the radial direction, of a second air flow guide cap, wherein the first air flow guide cap is positioned aft of the second air flow guide cap with respect to the aft direction defined by the second air flow guide cap, and wherein the respective air inlets of the second air flow guide cap and the first air flow guide cap are each configured to receive an airflow flowing from the forward end of the combustion duct.

2. The apparatus according to claim 1, wherein the aft side of the wall surface of each respective air flow guide cap is formed opposite the air inlet of the respective air flow guide cap, and each air flow guide cap includes a protrusion member that extends from the respective aft side of the respective wall surface.

3. The apparatus according to claim 2, wherein each protrusion member is in contact with a respective inner circumferential surface of a respective through hole at which the respective air flow guide cap is disposed.

* * * * *